(12) United States Patent
Ikenishi

(10) Patent No.: US 12,319,607 B2
(45) Date of Patent: Jun. 3, 2025

(54) GLASS SUBSTRATE, METHOD OF MANUFACTURING GLASS SUBSTRATE, AND METHOD OF MANUFACTURING GLASS ELEMENT USING GLASS SUBSTRATE

(71) Applicant: HOYA CORPORATION, Tokyo (JP)

(72) Inventor: Mikio Ikenishi, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 40 days.

(21) Appl. No.: 18/127,903

(22) Filed: Mar. 29, 2023

(65) Prior Publication Data

US 2023/0348313 A1    Nov. 2, 2023

(30) Foreign Application Priority Data

Mar. 31, 2022  (JP) .................... 2022-058291

(51) Int. Cl.
| | | |
|---|---|---|
| C03B 23/203 | (2006.01) | |
| C03B 23/207 | (2006.01) | |
| C03B 33/06 | (2006.01) | |
| C03C 27/10 | (2006.01) | |

(52) U.S. Cl.
CPC ............ *C03B 33/06* (2013.01); *C03B 23/207* (2013.01); *C03C 27/10* (2013.01); *C03B 23/203* (2013.01)

(58) Field of Classification Search
None
See application file for complete search history.

(56) References Cited

U.S. PATENT DOCUMENTS

| | | | | |
|---|---|---|---|---|
| 2,052,229 A | * | 8/1936 | Hyde ...................... | C03C 27/06 52/309.3 |
| 4,422,893 A | * | 12/1983 | Duchateau .............. | F24S 23/82 428/912.2 |
| 2016/0216792 A1 | | 7/2016 | Ogawa et al. | |

FOREIGN PATENT DOCUMENTS

JP    2016-139174    8/2016

* cited by examiner

*Primary Examiner* — Alexander S Thomas
(74) *Attorney, Agent, or Firm* — GREENBLUM & BERNSTEIN P.L.C

(57) ABSTRACT

The glass substrate having opposing flat two main surfaces includes a plurality of optically homogeneous glass pieces joined with one another, in which a junction surface between the joined glass pieces is perpendicular or substantially perpendicular with respect to the two main surfaces.

4 Claims, 3 Drawing Sheets

GLASS SUBSTRATE, METHOD OF MANUFACTURING GLASS SUBSTRATE, AND METHOD OF MANUFACTURING GLASS ELEMENT USING GLASS SUBSTRATE

CROSS-REFERENCE TO RELATED APPLICATIONS

This application claims priority under 35 U.S.C 119 to Japanese Patent Application No. 2022-058291 filed on Mar. 31, 2022. The above application is hereby expressly incorporated by reference, in its entirety, into the present application.

FIELD OF INVENTION

The present invention relates to a glass substrate suitable for manufacturing a plurality of optically homogeneous glass elements at once, a method of manufacturing the glass substrate, and a method of manufacturing a glass element using the glass substrate.

BACKGROUND

In recent years, a head mount display to be worn on the head of the human body, and for allowing a wearer to visually recognize an image personally, and a wearable computer using the same have been under development. As disclosed in Japanese Patent Application Publication No. 2016-139174, which is hereby expressly incorporated by reference in its entirety, for the head mount display, light guide plates 310 and 320 made of glass are used. A head mount display including a light guide plate formed of a high-refractive index low-specific-gravity optical glass is excellent in sense of immersion due to the wide viewing angle, and is preferable as an image display device to be used in combination with an information terminal, to be used for provision of AR (Augmented Reality), or the like, and to be used for provision of watching movies, games, VR (Virtual Reality), or the like.

SUMMARY OF INVENTION

At the time of the operation of a display, a light travels in a light guide plate while repeating total reflection. The higher the refractive index of the glass forming the light guide plate is, the smaller the critical angle at the light guide plate surface is. Thus, the viewing angle of the display can be increased. For this reason, glass with a high refractive index is desirably used for the light guide plate.

While glass with a high refractive index has a high content of components with a high refractive index such as rare earth components, $TiO_2$, $Nb_2O_5$, $WO_3$, and $Ta_2O_5$, the glass has a low content of components forming the network of the glass such as $B_2O_3$ and $SiO_2$. For this reason, glass with a high refractive index tends to be low in thermal stability of glass.

With such glass with a low thermal stability, it is difficult to manufacture a glass molded product with a small surface area per volume from molten glass. This is due to the following reason: a glass molded product with a small surface area per volume includes much glass not exposed to the surface; thus, heat tends to remain in the inside even upon quenching, so that crystallization progresses in the inside, resulting in devitrification.

On the other hand, the steps of manufacturing a light guide plate include the step of forming a diffraction grating on the surface of a glass substrate with a size as large as spectacle lenses, or forming a multilayer film thereon. Performing the steps for every light guide plate cannot be said to be preferable from the viewpoint of the productivity or from the viewpoint of the manufacturing cost. As the method of solving this, as with manufacturing of a chip of a semiconductor element, a large number of chips are formed in a silicon wafer, which is divided into individual chips using a dicing saw at the final step. This can manufacture a large number of semiconductor elements at once, and hence is efficient.

For manufacturing a semiconductor element, first, an ingot of silicon is manufactured, and an ingot in a cylindrical shape is sliced, thereby manufacturing a large number of silicon wafers. In the case where a light guide plate is manufactured with such a method, a glass element can be manufactured with efficiency, for example, by manufacturing a large-sized glass molded product in a cylindrical shape with a diameter of several hundreds of millimeters and using a manufacturing device of a semiconductor element. However, manufacturing of a large-sized glass molded product in a cylindrical shape with a diameter of several hundreds of millimeters from molten glass is difficult for the foregoing reason in the case of a high-refractive index glass.

As with a high-refractive index glass, it is also not easy to form high-quality cylindrical glass including low dispersion glass, and having a diameter of several hundreds of millimeters. The low dispersion glass includes a large amount of fluorine components. The fluorine component tends to be volatilized from the glass surface in a high temperature state. When glass cannot be quenched at the time of molding, the fluorine concentration of the glass surface is reduced. Then, in order to compensate for the reduction of the fluorine concentration of the surface portion, local convection is caused in the glass, resulting in an optically nonuniform defect referred to as stria.

In view of the foregoing circumstances, one aspect of the present invention provides for a glass substrate suitable for manufacturing a plurality of optically homogeneous glass elements at once, and a manufacturing method thereof, and a method of manufacturing a large number of glass elements using the glass substrate.

The present inventors conducted extensive research thereon. As a result, they found a method of manufacturing a glass substrate in the following manner: the side surfaces of optically homogeneous columnar glasses are joined with one another, thereby manufacturing a bunch of columnar glasses, or the like; the bunch of columnar glasses is sliced, thereby manufacturing a plurality of glass substrates. That is, one aspect of the present invention includes the following.

[1] A glass substrate having opposing flat two main surfaces,
  in which the glass substrate having the two main surfaces
    includes a plurality of optically homogeneous glass pieces being joined with one another, and
    a junction surface between the joined glass pieces being perpendicular or substantially perpendicular with respect to the two main surfaces.

[2] The glass substrate according to [1], in which the shapes in a plan view of the plurality of glass pieces present within the region surrounded by the outermost glass pieces forming the side surface of the glass substrate are the same and/or substantially the same.

[3] The glass substrate according to [2], in which each shape in a plan view of the plurality of glass pieces having the same or substantially the same shapes in a plan view is any of a square, a rectangle, and a regular hexagon, and the glass pieces are packed closest in the region surrounded by the outermost glass pieces.

[4] The glass substrate according to any one of [1] to [3], in which the glass forming the glass piece is the glass of any of the following (1) to (3):
(1) glass with a refractive index nd of 1.80 or more;
(2) glass having a liquidus temperature, and having a viscosity at the liquidus temperature of 500 dPa·s or less; and
(3) fluorophosphate glass.

[5] The glass substrate according to any one of [1] to [4], in which the diameter of a circle A is 30 mm or more, and the diameter of a circle B is 150 mm or less where A represents a virtual circle inscribed in the contour line of the outer circumference of each glass piece, and B represents a virtual circle circumscribed on the shape in a plan view of each glass piece, in a plan view of the main surface.

[6] A method of manufacturing a glass substrate, including the steps of:
preparing a plurality of columnar glasses including optically homogeneous glass, and having mutually the same and/or substantially the same cross sectional shapes;
joining the side surfaces of the respective columnar glasses to manufacture a bunch of the columnar glasses; and
slicing the bunch of the columnar glasses to manufacture a plurality of glass substrates.

[7] The method of manufacturing a glass substrate according to [6], in which the side surface of the bunch of the columnar glasses is processed into a cylindrical glass bunch, and the cylindrical glass bunch is sliced, thereby manufacturing a plurality of glass substrates.

[8] A method of manufacturing a glass substrate, including the steps of:
preparing a plurality of glass thick sheets including optically homogeneous glass, and having mutually the same and/or substantially the same cross sectional shapes;
joining the side surfaces of the respective glass thick sheets to manufacture a bunch of the glass thick sheets; and
slicing the bunch of glass thick sheets to manufacture a plurality of glass substrates each in a thin sheet disk shape.

[9] The method of manufacturing a glass substrate according to [8], in which after the step of manufacturing the bunch of glass thick sheets, the side surface of the bunch of glass thick sheets is processed, thereby manufacturing a disk-shaped glass thick sheet bunch, and the disk-shaped glass thick sheet bunch is sliced, thereby manufacturing a plurality of glass substrates each in a thin sheet disk shape.

[10] A method of manufacturing a glass element, including the steps of:
preparing the glass substrate according to any one of [1] to [5];
forming a glass element on a glass piece of the glass substrate; and
dividing the glass substrate, thereby obtaining a plurality of glass elements.

[11] A method of manufacturing a glass element including the steps of:
preparing the glass substrate manufactured by the manufacturing method according to any one of [6] to [9];
forming a glass element on a glass piece of the glass substrate; and
dividing the glass substrate, thereby obtaining a plurality of glass elements.

According to one aspect of the present invention, it is possible to provide a glass substrate suitable for manufacturing a plurality of optically homogeneous glass elements at once and a manufacturing method thereof, and a method of manufacturing a large number of glass elements using a glass substrate.

BRIEF DESCRIPTION OF THE DRAWINGS

FIG. 1(a) is a plan view of the main surface of a glass substrate, FIG. 1(b) is a side view of the glass substrate, and FIG. 1(c) is a view showing a glass piece included in the glass substrate of FIG. 1(a), a virtual circle A and a virtual circle B;

FIG. 2(a) is a plan view of the main surface of the glass substrate, FIG. 2(b) is a side view of the glass substrate, and FIG. 2(c) is a view showing the glass piece included in the glass substrate of FIG. 2(a), a virtual circle A and a virtual circle B; FIG. 3(a) shows the preparation of a plurality of columnar glasses having mutually the same and/or substantially the same cross sectional shapes, FIG. 3(b) shows a bunch of the columnar glasses manufactured by joining the side surfaces of the columnar glasses, FIG. 3(c) shows the glass bunch in a cylindrical shape processed by grinding the side surface of the bunch of columnar glasses, and FIG. 3(d) shows manufacturing of a plurality of thin sheet-shaped glass substrates by slicing the glass bunch in a cylindrical shape.

DESCRIPTION OF THE EMBODIMENTS

An aspect for executing the invention will be described with reference to the accompanying drawings.

Glass Substrate

One aspect of the present invention relates to a glass substrate having opposing flat two main surfaces, in which a plurality of optically homogeneous glass pieces are joined with one another, and the junction surface between the joined glass pieces is perpendicular or substantially perpendicular with respect to the two main surfaces.

A glass substrate of one aspect of the present invention will be described by reference to FIG. 1. FIG. 1 shows the outline of one example of a glass substrate 11 including a disk-shaped thin sheet.

Figure 1A:
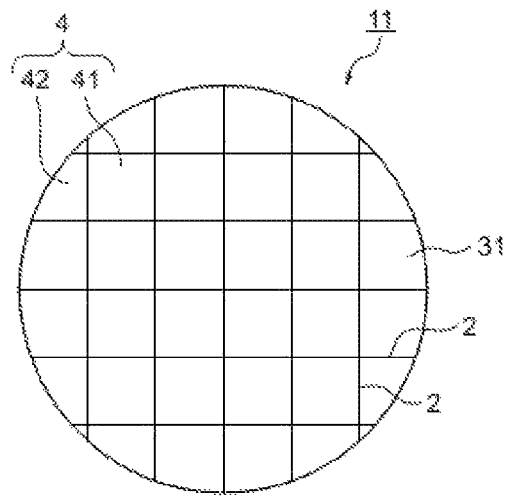
FIGS. 1(a)-1(c) show the outline of one example of a glass substrate including a disk-shaped thin sheet, where
Figure 1B:
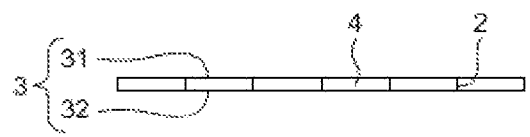
Figure 1C:
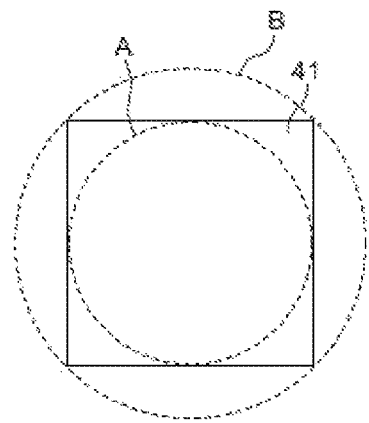

FIG. 1(a) shows a main surface 3 of the glass substrate 11 in a plan view, namely, a plan view. FIG. 1(b) is a side view of the glass substrate 11.

In the example shown in FIG. 1, 32 glass pieces 4 form the glass substrate 11. The side surfaces of the glass piece 4 are joined with one another. Of the 32 glass pieces 4, 16 glass pieces 41 are glass in a rectangular parallelepiped shape, and 16 glass pieces 42 forming the side surface of the glass substrate 11 are joined to the circumference of the glass substrate 11 in a rectangular parallelepiped shape. The glass pieces 42 forming the side surface may be referred to as outermost glass pieces in the present specification.

For joining between the side surfaces of the glass pieces 4, a known method of joining glasses such as an adhesive or sealing glass with a low melting point can be adopted.

The two surfaces of each glass piece 4 are smooth and flat, and are flat surfaces in parallel with each other. Further, for every glass piece 4, one surface thereof forms one main surface 31 of the glass substrate 11, and the other surface thereof forms the other main surface 32 of glass substrate 11. Still further, the distance between the two surfaces of each glass piece 4 is equal to the thickness of the glass substrate 11.

In the example of FIG. 1, although the shape of the bottom surface of the glass piece 4 in a shape of a rectangular parallelepiped is a rectangle, a cube-shaped glass piece is also acceptable. In that case, the bottom surface of the cube-shaped glass piece is a square.

Further, the glass piece in the shape of a rectangular parallelepiped and the cube-shaped glass piece may be combined with each other.

Figure 2A:
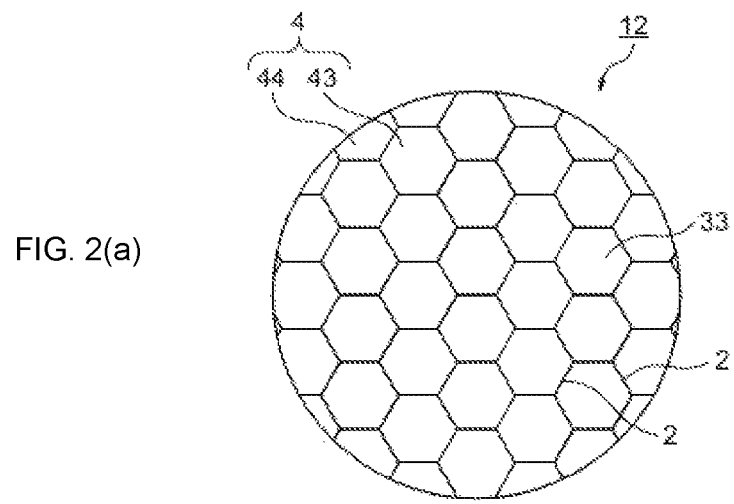
FIGS. 2(a)-2(c) show the outline of another example of the glass substrate including a disk-shaped thin sheet, where
Figure 2B:
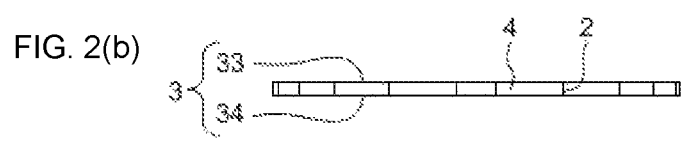
Figure 2C:
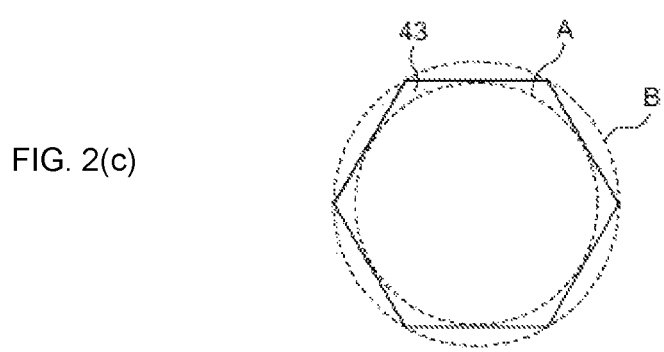

FIG. 2 shows the outline of a glass substrate 12 including a disk-shaped thin sheet of another example.

FIG. 2(a) shows a main surface 33 of the glass substrate 12 in a plan view. FIG. 2(b) is a side view of the glass substrate 12.

In this example, 48 glass pieces 4 form the glass substrate 12. Of the 48 glass pieces, 26 glass pieces 43 are each in the shape of a regular hexagonal prism, and 22 glass pieces 44 (outermost glass pieces) forming the side surface of the glass substrate 12 are joined to the circumference of the glass pieces each in the shape of a regular hexagonal prism. Other configurations are the same as those of the glass substrate 11 shown in FIG. 1.

In either of the glass substrates 11 and 12 shown in FIG. 1 and FIG. 2, respectively, the junction surface 2 (junction region) between the glass pieces 4 is perpendicular or substantially perpendicular with respect to the two main surfaces 3. Since the junction surface 2 (junction region) between the glass pieces 4 is perpendicular or substantially perpendicular with respect to the two main surfaces 3, the region usable for manufacturing the glass elements in the glass substrates 11 and 12 can be enlarged. Further, the junction precision between the glass pieces 4 can be enhanced.

In the glass substrates 11 and 12 shown in FIG. 1 and FIG. 2, respectively, the shapes in a plan view of the plurality of glass pieces 41 and 43 surrounded by the plurality of outermost glass pieces 42 and 44, respectively are the same and/or substantially the same. With this configuration, the arrays of the plurality of glass pieces 41 and 43 in respective glass substrates 11 and 12 can be made regular. This can facilitate use of the processing method such as photolithography when a plurality of glass elements are formed collectively at the glass substrates 11 and 12, respectively.

In the glass substrate 11 shown in FIG. 1, for respective main surfaces 31 and 32, a plurality of glass pieces 41 each in the shape of a rectangle in a plan view are packed closest in the region surrounded by the outermost glass pieces 42 forming the peripheral portion of each main surface, namely, the side surface of the glass substrate 11.

On the other hand, for the glass substrate 12 shown in FIG. 2, for respective main surfaces 33 and 34, a plurality of glass pieces 43 each in a shape of a regular hexagon in a plan view are packed closest in the region surrounded by the outermost glass pieces 44 forming the peripheral portion of each main surface, namely, the side surface of the glass substrate 12.

Thus, the shape in a plan view of each of the plurality of glass pieces in the region surrounded by the outermost glass pieces of the peripheral portion of the main surface is any of a square, a rectangle, and a regular hexagon for each main surface, and the glass pieces are packed closest in the region surrounded by the outermost glass pieces of the peripheral portion. As a result, the proportion of the optically homogeneous glass accounting for the glass substrate can be increased, which can increase the number of the glass elements obtainable per one glass substrate. Further, the junction area between the glass pieces can be increased, which can enhance the junction strength.

Although each shape of the glass substrates 11 and 12 shown in FIG. 1 and FIG. 2 is a thin sheet disk shape, it is not limited to a disk shape, and may be a polygon such as a tetragon, or other shapes.

However, when a plurality of glass elements are formed on a glass substrate using a manufacturing line of a semiconductor element, and the glass substrate is divided to separate a plurality of glass elements, the silicon wafer of the substrate of the semiconductor element is in a thin sheet disk shape, and hence the shape of the glass substrate is also preferably a thin sheet disk shape.

Then, the size of each glass piece 4 will be described. The glass piece 4 is required to be formed with a size fully including at least one glass element. Taking a light guide plate as an example of a glass element, although according to the shape of the substrate for a light guide plate, the size of the main surface of the glass piece 4 is made larger than the length of the longest diagonal line of the substrate for a light guide plate, or the length of the major axis of the substrate for a light guide plate.

For example, the glass element obtainable from the glass substrate 11 of one aspect of the present invention can be used as the light guide plate included in a head mount display, or the like. When the glass element is used as the light guide plate of a head mount display, the following size is assumed.

For the light guide plate of a head mount display, of the type in which one light guide plate guides a light to both eyes, and a type in which different light guide plates guide a light to one eye and the other eye, respectively, the light guide plate of the latter type has a smaller size. Therefore, the glass element can be used advantageously in the latter type. In order to allow one small-sized light guide plate to be accommodated in one glass piece, in a plan view of the main surface of the glass substrate, the diameter of the virtual circle A inscribed in the contour line of each glass piece is preferably 30 mm or more, and more preferably 40 mm or more. On the other hand, when the diameter of the virtual circle B circumscribed on the shape in a plan view of each glass piece is set extremely large in a plan view of the main surface of the glass substrate, at the time of molding a columnar glass or a glass thick sheet serving as the source of each glass piece, crystals become more likely to be precipitated, or an optically heterogeneous portion referred to as a stria becomes more likely to be generated in the molded product, which is not preferable. In consideration of such circumstances, the diameter of the circle B is preferably 150 mm or less, more preferably 120 mm or less, further preferably 100 mm or less, and still further preferably 80 mm or less.

The sheet thickness and the diameter of the glass substrate, the arithmetic average roughness Ra of the main surface, the parallelism of the glass substrate, and the arithmetic average roughness Ra of the side surface of the glass substrate may be appropriately determined according to the intended use. For example, the sheet thickness of the glass substrate may be 0.3 to 3 mm, the diameter may be 150 to 450 mm, the arithmetic average roughness Ra of the main surface may be 0.5 nm or less, the TTV (total thickness variation) of the glass substrate may be within 1 μm, and the arithmetic average roughness Ra of the side surface of the glass substrate may be 100 nm or less. The TTV is the difference between the maximum value and the minimum value of the thickness of the substrate.

Taking the size of FIG. 1 as an example, a glass substrate 11 with a diameter of about 283 mm includes a glass piece 41 in the shape of a square with a side of about 50 mm. For the glass piece 41, the virtual circle A has a diameter of about 50 mm, and the virtual circle B has a diameter of about 71 mm.

Further, taking the size of FIG. 2 as an example, a glass substrate 12 with a diameter of about 318 mm includes a glass piece 43 in the shape of a regular hexagon with a side of 29 mm. For the glass piece 43, the virtual circle A has a diameter of about 50 mm, and the virtual circle B has a diameter of about 58 mm.

Then, the glass forming the glass piece 4 will be described. In the present aspect, the glass to be used has no particular restriction so long as it is optically homogeneous.

On the other hand, as the glass for use in the present aspect, the following glasses (1) to (4) can be exemplified:
(1) Glass with a Refractive Index Nd of 1.80 or More (Described as an Optical Glass A)

Examples of the optical glass A include optical glass including $B_2O_3$ and $La_2O_3$ as a glass component, optical glass including $SIO_2$ and $Nb_2O_5$, optical glass including $SiO_2$ and $TiO_2$, optical glass including $P_2O_5$ and $Nb_2O_5$, and optical glass including $P_2O_5$ and $TiO_2$. The preferable glass refractive index nd of the optical glass A is 1.85 or more, the more preferable glass refractive index nd is 1.88 or more, and the further preferable glass refractive index nd is 1.90 or more. The examples are glasses preferably for a substrate for a light guide plate, or the like.
(2) Glass Having a Liquidus Temperature, in which the Viscosity at the Liquidus Temperature is 500 dPa·s or Less (Optical Glass B)

Examples of the optical glass B include optical glass including $B_2O_3$ and $La_2O_3$ as a glass component, optical glass including $SiO_2$ and $Nb_2O_5$, optical glass including $SiO_2$ and $TiO_2$, optical glass including $P_2O_5$ and $Nb_2O_5$, and optical glass including $P_2O_5$ and $TiO_2$. The preferable glass refractive index nd of the optical glass B is 1.80 or more, the more preferable glass refractive index nd is 1.85 or more, the further preferable glass refractive index nd is 1.88 or more, and the still further preferable glass refractive index nd is 1.90 or more. The above examples are glasses suitable for a substrate for a light guide plate, or the like. Even glass with a viscosity at the liquidus temperature of 100 dPa·s or less can provide a high-quality glass substrate.
(3) Fluorophosphate Glass (Optical Glass C)

Examples of the optical glass C include optical glass including P, Al, O and F as a glass component, and optical glass including P, Al, an alkaline-earth metal, O and F. Examples of the optical glass C include fluorophosphate glass with an Abbe's number vd of 60 or more.
(4) Cu-Containing Near-Infrared Light Absorbing Glass (Optical Glass D)

Examples of the optical glass D include Cu-containing fluorophosphate glass, and Cu-containing phosphate glass. These are glasses suitable for the case where a filter element for transmitting a visible light therethrough, and cutting a near-infrared light is manufactured. The examples are glasses suitable for a substrate for a light guide plate, or the like.

Among the above glasses, glasses of (1) to (3) are preferable.

Manufacturing Method of Glass Substrate

In one aspect of the present invention, a first aspect of the method of manufacturing the glass substrate 11 is a method of manufacturing the glass substrate 11, including preparing a plurality of columnar glasses 5 formed of optically homogeneous glass, and having mutually the same and/or substantially the same cross sectional shapes; joining the side surfaces 51 of the respective columnar glasses, thereby manufacturing a bunch 6 of the columnar glasses; and slicing the bunch 6 of the columnar glasses, thereby manufacturing a plurality of glass substrates 11.

With a known manufacturing method of optical glass, it is possible to manufacture a plurality of columnar glasses 5 each including optically homogeneous glass, and having mutually the same and/or substantially the same cross sectional shapes. Below, one example thereof will be described.

The compound raw materials corresponding to the constituent components of glass are weighed, and are thoroughly mixed, resulting in a prepared raw material. The prepared raw material is charged into a crucible made of platinum, is heated and molten, and is homogenized by stirring, followed by clarification, resulting in molten glass. The molten glass is casted in a mold, and is molded into a sheet shape referred to as an E bar or a strip material, to be gradually cooled, resulting in an optically homogeneous glass sheet. Molding into a sheet shape can reduce the surface area per unit volume, which enables quenching of the whole glass. For this reason, it is possible to suppress the occurrence of devitrification and stria.

Figures 3A, 3B, 3C, 3D:
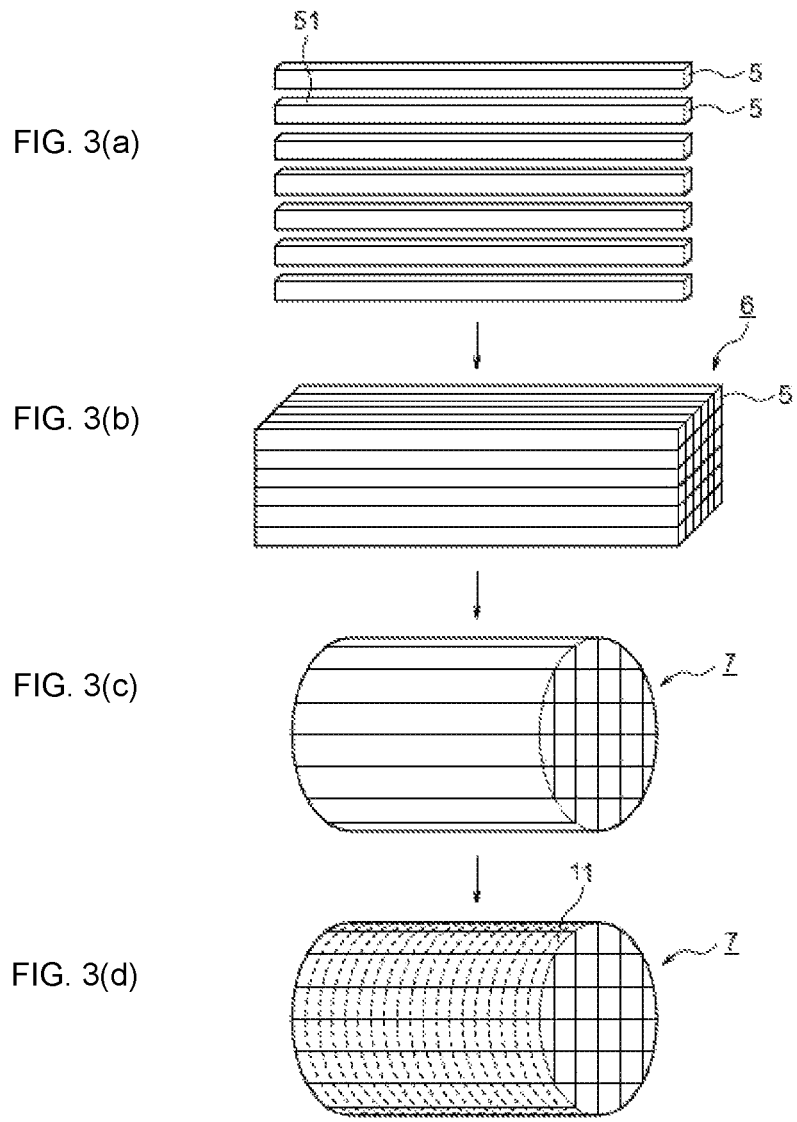
FIGS. 3(a)-3(d) are explanatory views of a manufacturing method of manufacturing the thin sheet-shaped glass substrate of FIG. 1(a), where

The glass sheet thus manufactured is divided with a known method, thereby manufacturing a plurality of glass quadrangular prisms (columnar glasses 5) as shown in FIG. 3(a). The cross sectional shapes and the lengths of respective columnar glasses 5 are made even.

Then, the side surfaces 51 of the columnar glasses are joined with one another, thereby manufacturing a bunch 6 of the columnar glasses as shown in FIG. 3(b). For joining, joining is established between the side surfaces 51 equal in shape of the columnar glasses 5. As described above, the joining may be established by a known method such as joining by an adhesive or joining using a low-melting-point sealing glass.

Then, the side surface of the bunch 6 of the columnar glasses is ground by a known method, thereby processing the bunch 6 of the columnar glasses into a cylindrical glass bunch 7 as shown in FIG. 3(c). If required, the side surface of the cylindrical glass bunch 7 is polished, to be smoothed.

Then, at the site indicated with a broken line of FIG. 3(d), the cylindrical glass bunch 7 is sliced perpendicularly with respect to the axis of the cylinder, thereby manufacturing a plurality of thin-sheet-shaped glass substrates 11. Herein, slicing means cutting the cylindrical glass bunch 7 in the direction perpendicular to the longitudinal direction of the cylindrical glass bunch 7 so as to provide a plurality of substrates. Slice processing is performed with a known method such as cutting by a wire saw for cutting glass. In this manner, the glass substrates 11 shown in FIG. 1 are manufactured.

A second aspect of the present invention is the following method of manufacturing a glass substrate: a plurality of glass thick sheets including optically homogeneous glass, and having mutually the same and/or substantially the same cross sectional shapes are prepared; the side surfaces of respective glass thick sheets are joined with one another, thereby manufacturing a bunch of the glass thick sheets; the bunch of the glass thick sheets is sliced, thereby manufacturing a plurality of thin-sheet-disk-shaped glass substrates.

The glass thick sheet can be manufactured by processing an E bar or a strip material in the same manner as with the columnar glass 5 in the first aspect.

Then, the side surfaces of the glass thick sheets are joined with one another in the same manner as with the first aspect, thereby manufacturing a bunch of the glass thick sheets.

Then, the side surface of the bunch of the glass thick sheets is ground by a known method, thereby to be processed into a disk-shaped glass thick sheet bunch. If required, the side surface of the disk-shaped glass thick sheet bunch is polished and is smoothed.

Then, in the same manner as with the first aspect, the glass thick sheet bunch is sliced, thereby manufacturing a plurality of glass substrates each in the shape of a thin sheet disk. Slice processing is performed by a known method such as cutting by a wire saw for cutting glass.

With the above method, the glass in the shape of a quadrangular prism or a glass thick sheet in the shape of a rectangular parallelepiped was used. However, for example, glass in the shape of a regular hexagonal prism can be used. Using glass in the shape of a regular hexagonal prism, the side surfaces thereof are joined with one another, thereby manufacturing a bunch of glasses in the shape of a regular hexagonal prism. The side surface of the bunch of glasses is ground and polished, resulting in a cylindrical glass including the glasses in the shape of a regular hexagonal prism packed closest therein. The cylindrical glass is sliced perpendicularly with respect to the axis of the cylinder. As a result, the glass substrate shown in FIG. 2 can be prepared.

Manufacturing Method of Glass Element

The first aspect of the method of manufacturing a glass element is a method of manufacturing a glass element as follows: using the glass substrate of the first aspect, a glass element is formed at the glass piece 41 of the glass substrate; and the glass substrate is divided, resulting in a plurality of glass elements.

For example, when a glass element is manufactured as a light guide plate, a diffraction grating for extracting the light propagating in the light guide plate is formed at the glass piece of the glass substrate by photolithography, or a multilayer film is formed at the surface. Further, a light guide path may be provided at a light guide plate.

The glass elements may be formed on all the glass pieces in the glass substrate, or may be formed at a plurality of glass pieces appropriately selected.

After forming the glass elements, the respective glass elements are separated by dicing, resulting in a plurality of glass elements. The separation is preferably performed by separation at the junction surface, which facilitates cutting.

A second aspect of the method of manufacturing a glass element is a method of manufacturing a glass element as follows: a glass substrate of a second aspect is manufactured; a glass element is formed at a glass piece of the glass substrate; and the glass substrate is divided, resulting in a plurality of glass elements.

The method of forming a glass element, and a method of dividing the glass substrate, and obtaining a plurality of glass elements are the same as those of the first aspect.

EXAMPLES

Glass raw materials were prepared so as to obtain glasses showing the compositions and the optical characteristics shown in Tables 1 and 2. The prepared raw materials were heated, molten, homogenized, and clarified, and were casted in a mold, thereby molding each sheet-shaped glass, followed by gradual cooling. For all the sheet-shaped glasses, precipitation of a crystal and stria were not observed, and the glasses were optically homogeneous. For both the optical glass a and the optical glass b, the liquidus temperature was present, and the viscosity at the liquidus temperature was 100 dPa·s or less.

The refractive index nd was measured by the refractive index measuring method according to JIS B 7071-1:2022 for each glass gradually cooled at a temperature decreasing speed of −30° C./hour. The refractive indices ng, nF, and nC were also measured in the same manner, thereby calculating the Abbe's number νd based on the following equation.

$$\nu d = (nd-1)/(nF-nC)$$

TABLE 1

| Mass % | Optical glass a | Optical glass b |
|---|---|---|
| $B_2O_3$ | 8.09 | 9.35 |
| $SiO_2$ | 6.2 | 4.73 |
| $La_2O_3$ | 33.56 | 49.34 |
| $Gd_2O_3$ | 0 | 7.6 |
| $Y2O3$ | 0 | 0.56 |
| $Nb_2O_5$ | 8.3 | 7.96 |
| $TiO_2$ | 20.37 | 13.2 |
| $ZrO_2$ | 6.59 | 5.85 |
| ZnO | 1.2 | 1.41 |
| BaO | 15.69 | 0 |
| Total | 100 | 100 |
| Refractive index nd | 2.00069 | 2.001 |
| Abbe's number νd | 25.458 | 29.13 |

TABLE 2

| | | Optical glass c | Optical glass d | Optical glass e | Optical glass f | Optical glass g |
|---|---|---|---|---|---|---|
| Cation % | P | 28 | 6.28 | 27.87 | 45.26 | 66.08 |
| | Al | 21.92 | 32.4 | 16.8 | 6.04 | 1.94 |
| | Mg | 6.82 | 6.77 | 4.74 | 12.39 | 0 |
| | Ca | 13.97 | 28.46 | 10.02 | 4.13 | 0 |
| | Sr | 16.91 | 17 | 10.05 | 3.1 | 0 |
| | Ba | 11.73 | 4.66 | 6.26 | 4.13 | 0 |
| | Li | 0 | 1.98 | 22.97 | 0 | 13.51 |
| | Na | 0 | 1.19 | 0 | 22.62 | 0 |
| | Y | 0.65 | 1.26 | 0 | 1.01 | 0.67 |
| | La | 0 | 0 | 0 | 0 | 0.29 |
| | Cu | 0 | 0 | 1.29 | 1.32 | 17.51 |
| | Total | 100 | 100 | 100 | 100 | 100 |
| Anion % | O | 37.73 | 8.62 | 53.21 | 86.84 | 100 |
| | F | 62.27 | 91.21 | 46.79 | 13.16 | 0 |
| | Cl | 0 | 0.17 | 0 | 0 | 0 |
| | Total | 100 | 100 | 100 | 100 | 100 |
| Optical characteristics | Refractive index nd | 1.497 | 1.437 | — | — | — |
| | Abbe's number νd | 81.609 | 95.1 | — | — | — |

The sheet-shaped glass was cut, thereby manufacturing a plurality of glasses 5 each in the shape of a quadrangular prism as in FIG. 3(a). Then, the side surfaces 51 of the glasses each in the shape of a quadrangular prism were joined with one another, thereby manufacturing a glass bunch 6 shown in FIG. 3(b).

The side surface of the glass bunch 6 was ground and polished, thereby manufacturing a cylindrical glass bunch 7 with a smooth side surface shown in FIG. 3(c). The length of the cylindrical glass bunch 7 was 30 mm, and the diameter thereof was 300 mm.

The glass bunch was sliced perpendicularly with respect to the axis of the cylinder at regular intervals using a wire saw, thereby manufacturing a large number of glass substrates 11 in the shape of a thin sheet disk with a thickness of 0.5 mm, and a diameter of 300 mm.

Then, both the main surfaces of each glass substrate 11 were polished with a known method, resulting in smooth surfaces with an arithmetic average roughness Ra of 0.5 nm or less. The TTV of the glass substrate 11 was within 1 μm.

Then, using a semiconductor manufacturing device, each glass piece of the glass substrate 11 was subjected to coating, thereby forming a diffraction grating at the light emission position. As a result, a light guide plate was manufactured. Then, each light guide plate was separated at the junction surface by a dicing machine, resulting in a plurality of light guide plates.

In the above example, the glass substrate 11 was manufactured through the glass bunch 6 including the columnar glasses 5. However, the following procedure is also acceptable: a bunch including glass thick sheets is manufactured; and a glass substrate is manufactured from the bunch.

One aspect of the present invention can provide a glass substrate suitable for manufacturing a plurality of optically homogeneous glass elements at once, and a manufacturing method thereof, and a method of manufacturing a large number of glass elements using the glass substrate.

The embodiments disclosed herein should be considered to be illustrative and not to be limiting in all respects. The scope of the present invention is indicated not by the above description but by the appended claims, and is intended to include the meanings equivalent to the appended claims and all the changes within the scope.

Further, it is naturally understood that two or more of the matters exemplified or described as the preferable scope in the specification can be combined arbitrarily.

What is claimed is:

1. A glass substrate, which has opposing flat two main surfaces, wherein
    the glass substrate having the two main surfaces comprises a plurality of optically homogeneous glass pieces being joined with one another,
    a junction surface between the joined glass pieces is perpendicular or substantially perpendicular with respect to the two main surfaces,
    the glass consists of a single layer,
    no support is positioned on either of the two main surfaces of the glass substrate, shapes in a plan view of the plurality of glass pieces present within a region surrounded by outermost glass pieces forming a side surface of the glass substrate are the same and/or substantially the same, each shape in a plan view of the plurality of glass pieces having the same or substantially the same shapes being any of a square, a rectangle, and a regular hexagon, and
    the glass pieces are packed closest in the region surrounded by the outermost glass pieces.

2. A glass substrate, which has opposing flat two main surfaces, wherein
    the glass substrate having the two main surfaces comprises a plurality of optically homogeneous glass pieces being joined with one another,
    a junction surface between the joined glass pieces is perpendicular or substantially perpendicular with respect to the two main surfaces,
    the glass consists of a single layer,
    no support is positioned on either of the two main surfaces of the glass substrate, and
    glass forming the glass pieces is glass of any of the following (1) to (3):
    (1) glass with a refractive index nd of 1.80 or more;
    (2) glass having a liquidus temperature, and having a viscosity at the liquidus temperature of 500 dPa·s or less; and
    (3) fluorophosphate glass.

3. The glass substrate according to claim 2,
    wherein a diameter of a circle A is 30 mm or more, and a diameter of a circle B is 150 mm or less where A represents a virtual circle inscribed in a contour line of an outer circumference of each glass piece, and B represents a virtual circle circumscribed on a shape in a plan view of each glass piece, in a plan view of the main surface.

4. A glass substrate, which has opposing flat two main surfaces, wherein
    the glass substrate having the two main surfaces comprises a plurality of optically homogeneous glass pieces being joined with one another,
    a junction surface between the joined glass pieces is perpendicular or substantially perpendicular with respect to the two main surfaces,
    the glass consists of a single layer,
    no support is positioned on either of the two main surfaces of the glass substrate, and
    a diameter of a circle A is 30 mm or more, and a diameter of a circle B is 150 mm or less where A represents a virtual circle inscribed in a contour line of an outer circumference of each glass piece, and B represents a virtual circle circumscribed on a shape in a plan view of each glass piece, in a plan view of the main surface.

* * * * *